June 12, 1956 — W. M. HAWKINS, JR., ET AL — 2,750,134
MULTIPLE WHEEL MAIN LANDING GEAR
Filed April 17, 1952 — 2 Sheets-Sheet 1
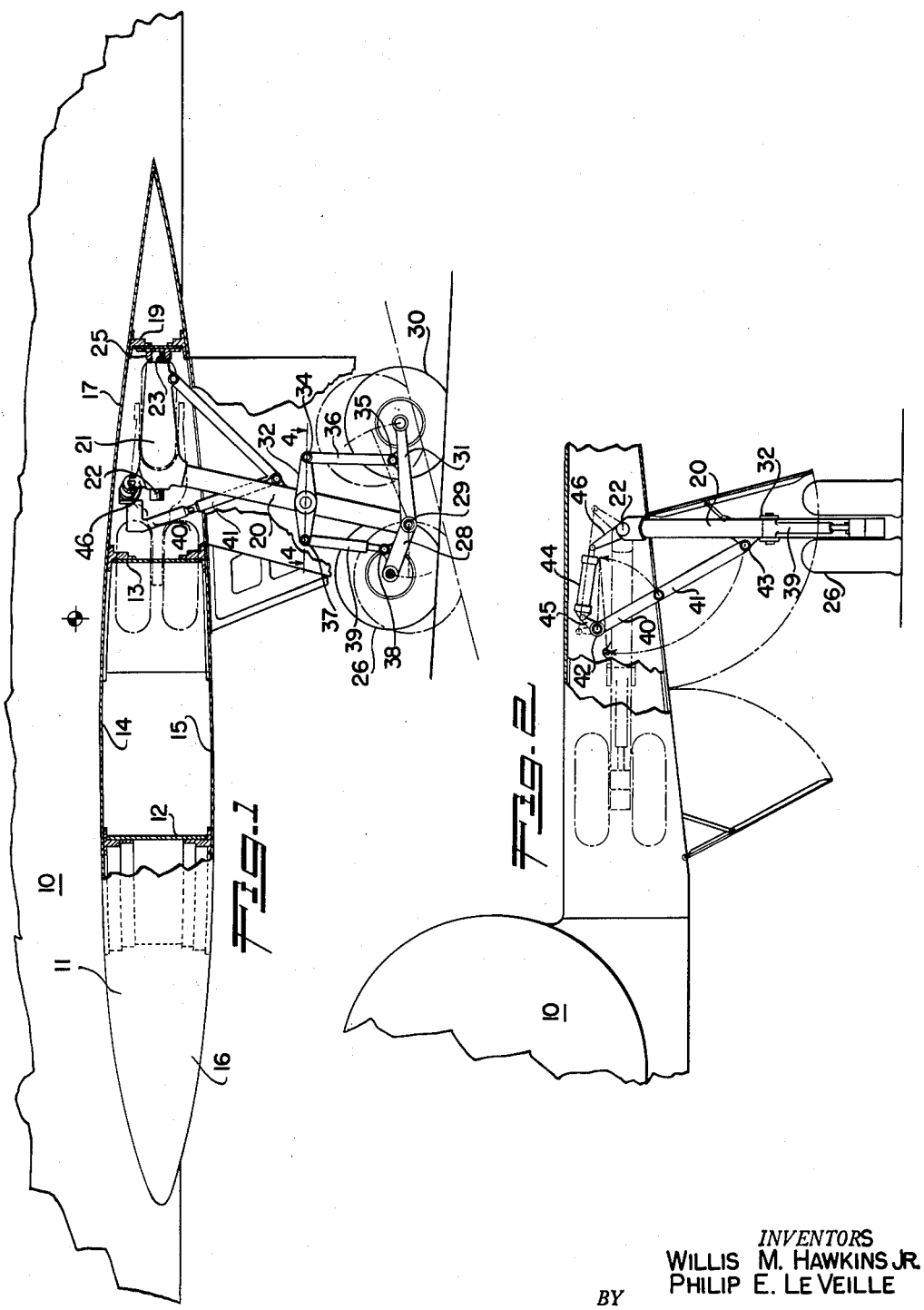
INVENTORS
WILLIS M. HAWKINS JR.
PHILIP E. LE VEILLE
BY
George Sullivan
Agent

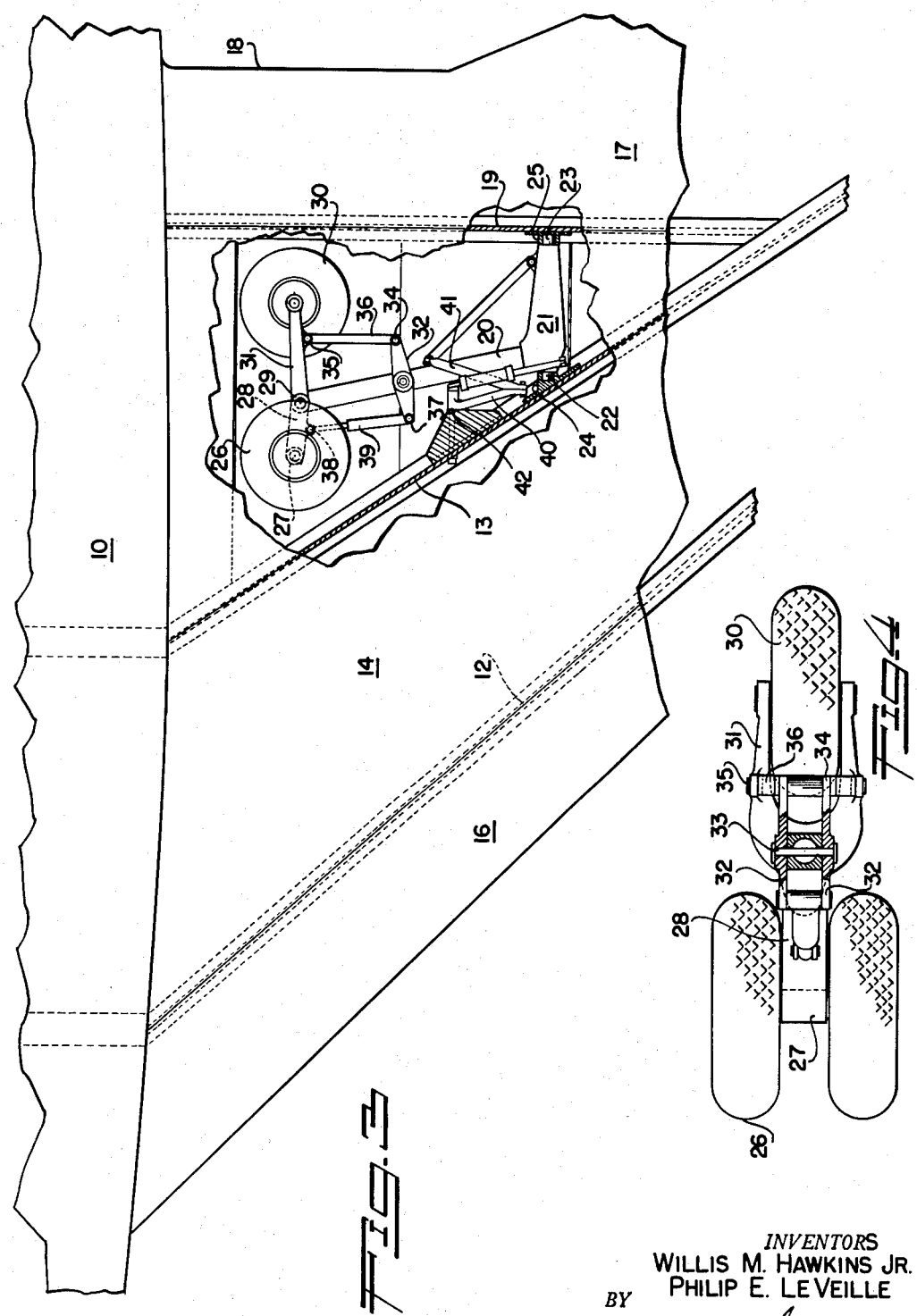

United States Patent Office 2,750,134
Patented June 12, 1956

2,750,134

MULTIPLE WHEEL MAIN LANDING GEAR

Willis M. Hawkins, Jr., North Hollywood, and Philip E. Le Veille, Glendale, Calif., assignors to Lockheed Aircraft Corporation, Burbank, Calif.

Application April 17, 1952, Serial No. 282,798

11 Claims. (Cl. 244—102)

This invention relates to an improved retractable multiple wheel or bogie type of landing gear particularly adapted for use with modern thin wing types of airplanes wherein the gear can be retracted into the trailing edge of the wing adjacent the wing root, thus occupying an unstressed part of the wing to the rear of the main beam or box section, thus avoiding door cut-outs in stressed structure.

It is an important object of this invention to provide an improved multiple wheel landing gear of a configuration that can be retracted into the wing section adjacent the root thereof and to the rear of the main wing spars, thus avoiding cut-outs in the highly stressed box beam structure formed by the spars and connecting wing skins.

It is another object of this invention to provide an improved and simplified multiple wheel landing gear of the bogie type arranged to conform to the tapered space available in the trailing edge portion of a wing section, whereby the bogie may be retracted into the available space to the rear of the wing spars.

It is a further object of this invention to provide a three wheel bogie type of landing gear wherein the weight distribution to the three wheels can be predetermined for best performance under landing and braking loads.

It is a principal object of this invention to provide a main landing gear of the type described that can be retracted into the wing aft of the main wing structure, with a minimum of aerodynamic drag when so retracted. While not limited thereto, such an arrangement is especially suitable for use with swept wing types of aircraft, as the trailing edge pocket behind the rear wing beam can be enclosed at the rear by an auxiliary beam extending normal to the fuselage to a junction with the swept wing beam to define the landing gear pocket and serve as the rear pivot point for the landing gear trunnion.

Other and further objects of this invention will become readily apparent from the following specification and the accompanying drawings wherein a preferred form of the invention is illustrated, and in which:

Figure 1 is a section through an airplane wing parallel to the longitudinal axis of the airplane and in the plane of one main landing gear embodying the features of this invention;

Figure 2 is a front view of the main landing gear of Figure 1, the wing structure being partly broken away for clarity;

Figure 3 is a plan view of a swept wing type of airplane with the top skin of the wing partly broken away to show the landing gear in its retracted position; and Figure 4 is a section through the landing gear taken on the line 4—4 of Figure 1 to show a top view of the wheel equalizing linkage arrangement.

As shown on the drawings:

An airplane 10 having a swept wing 11 has been fragmentarily shown on the drawings to illustrate a preferred embodiment of this invention. The wing structure comprises a pair of main wing spars 12 and 13 tied together by heavy skins 14 and 15 to form the chief structural member of the cantilever wing, commonly called a torsion box beam. The wing leading edge 16 attaches to the front spar 12, and a trailing edge 17 attaches to the rear spar 13 to complete the wing section. Ordinarily the trailing edge of the wing is primarily a fairing rather than a stressed member, while the interior of the torsion box beam and perhaps also the leading edge is utilized for fuel tankage. In such a swept wing design the trailing edge portion adjacent the root of the wing also can be lengthened chordwise, as indicated by the line 18, to increase the available area in the angle between the rear wing spar 13 and the side of the fuselage to provide added space and depth to receive the main landing gear of this invention. An auxiliary spar or beam 19 may be conveniently arranged in the trailing edge 17 to the rear of the wheel well and normal to the fuselage for attachment at its outer end to the rear main spar 13, the spar 19 serving to partially support the landing gear, as will be later described.

The main landing gear per se comprises a depending strut 20 carrying at its top a trunnion member 21 having front and rear pivots 22 and 23 respectively journaled in suitable brackets 24 and 25 on the main spar 13 and the auxiliary spar 19 so that the strut can be swung up into the triangular space to the rear of the main spar 13. The strut 20 is angled forwardly relative to its trunnion axis in order that the wheels carried thereby will be properly positioned relative to the center of gravity of the airplane, and fit into the space provided for the retracted gear. Note should be made that the strut 20 is not a shock strut in the ordinary sense since it is not arranged with telescopic parts, as the shock absorbing arrangement is incorporated in the articulated bogie to be now described.

At the outer or free end of the strut 20, a pair of front wheels 26 are mounted on a common axle 27 carried by a lever 28 pivoted at 29 to the strut. Similarly a single rear wheel 30 is rotatably mounted in a fork-like lever 31, also pivoted at 29 to the strut thus forming an articulated bogie wherein both the front and rear wheels are free to independently oscillate up and down in response to ground irregularities and landing shocks. Such movement of the wheels is controlled, and the load equalized, by a pair of equalizer levers 32 pivoted intermediate their ends on either side of the strut 20 at 33, the rear end 34 of the levers 32 being connected to the rear wheel fork 31 at 35 by links 36, and the front ends 37 of the levers 32 being connected to the front wheel lever 28 at 38 by a telescoping shock absorber 39 of the conventional telescoping piston and cylinder arrangement. When the front and rear wheels are under load, the shock absorber is at least partially compressed, and the equalizing linkage is so chosen that the load is distributed in a predetermined manner between the front and rear tires.

In the simplest case of equal sized tires it may be desired to distribute the static load equally between the three wheels, and in such event the geometry of the links and shock absorber pivot connections to the bogie levers and to the equalizer member is so chosen as to apply twice the load to the front wheel axle 27. However, landing impacts and braking reactions may be favored by increasing the load on the rear wheel and this may be done by altering the overall geometry of the linkage connections to the bogie and equalizer members. Also, consideration of space available in the wheel well may make it desirable to use smaller front wheels in which case the linkage geometry may be altered to compensate for the lesser load capacity of such smaller wheels. To simplify the foregoing explanation, the links and shock absorber could be considered attached at their lower ends to the wheel axles, and the bogie lever lengths made in the ratio of two to one, in which case the arms of the equalizer levers, would also have the same ratio for the simplest case mentioned above. Moving the lower attachment points of the links and shock absorber towards the strut 20 as shown on the drawings requires that the geometry of the linkage be analyzed in determining the connection points to produce the desired distribution of the load between the wheels.

A hydraulic landing gear retracting mechanism has been shown in the drawings, including links 40 and 41 hinged together, with link 40 pivoted at 42 in the wing and link 41 pivoted to the strut 20 at 43. When the links 40 and 41 are extended into alignment they extend the strut 20 and act as a side brace or strut for the strut 20, as best shown in Figure 2. When these links are folded they retract the entire landing gear into the wheel well in the trailing edge of the wing, as best shown in Figure 3. The links are operated between these positions by a hydraulic cylinder and piston rod combination 44 pivoted between a lever or crank 45 on the pivoted end 42 of the link 40 and a lever or crank 46 on the trunnion member 21. Thus elongation of the hydraulic cylinder and piston combination retracts the landing gear into the wing and extension of the gear is attained by applying hydraulic force in the opposite direction.

In connection with the preferred form of this invention involving a swept wing, it will be noted that the resulting wheel well is in the form of a right angled triangle, the base of which is parallel to the wing root and longitudinal axis of the airplane, and the side of which is formed by the auxiliary beam 19. The hypothenuse of the triangle is formed by the rear main beam 13 which also supports the outboard end of the beam 19. Since the triangular wheel well is entirely to the rear of the stressed wing structure no structural reinforcements are required for the wheel well which occupies normally unused space in the unstressed trailing edge. The only reinforcement required to support the landing gear reactions is a support for the rear trunnion bearing 23 such as the auxiliary beam 19 which is supported at one end in the normal wing root structure, and at its outboard end by the rear main beam 13. Thus the trailing edge location greatly simplifies wing design and the triangular form of the wheel well is inherently rigid, further eliminating the need of structural provisions to carry the landing loads around the cut-out.

It will thus be seen that we have invented an improved and simplified retractable main landing gear arrangement wherein the stressed portion of an airplane wing is not weakened by cut-outs to receive the retracted landing gear; and in combination therewith have provided a multiple wheel articulated bogie type of gear especially suitable for retraction within the envelope of a wheel well located in the trailing edge of the airplane wing.

Having described only typical forms of the invention we do not wish to be limited to the specific details herein set forth, but wish to reserve to ourselves any variations or modifications that may appear to those skilled in the art and fall within the scope of the following claims.

We claim as our invention:

1. In an airplane having a main landing gear wheel well formed in the trailing edge of the wing thereof adjacent the wing root and to the rear of the main spar in said wing, the combination of a main landing gear structure the trunnion of which is pivotally supported to the rear of said main spar for retraction of said main landing gear into said wheel well, said main landing gear comprising a multiple wheel articulated bogie having two front wheels and a single rear wheel whereby to conform to the tapered shape of the section of trailing edge of the wing between the main spar and the auxiliary spar.

2. In an airplane of the swept wing type having main wing spars swept backward, a landing gear wheel well formed in the trailing edge of the wing in the angle formed by the rear of said main wing spar and the root of the wing, an auxiliary spar disposed in said trailing edge of the wing normal to the root of the wing and extending to the main wing spar outboard of said wheel well, said auxiliary spar defining the rear wall of the wheel well and the main spar defining the forward wall thereof, a landing gear trunnion member pivotally mounted between said main spar and said auxiliary spar adjacent the outboard side of the wheel well, a landing gear strut carried by said trunnion member, and a three wheel articulated bogie carried by the lower end of the strut, said bogie having two wheels in front of said strut and a single wheel to the rear thereof whereby when retracted into said wheel well the bogie conforms to the tapered section of the trailing edge of the wing in said wheel well.

3. In an airplane of the swept wing type having main wing spars swept backward, a landing gear wheel well formed in the trailing edge of the wing in the angle formed by the rear of said main wing spar and the root of the wing, a landing gear trunnion member pivotally mounted behind said main spar adjacent the outboard side of the wheel well, a landing gear strut carried by said trunnion member, and a multiple wheel articulated bogie type of landing gear carried by the lower end of said strut, said bogie type of landing gear having a generally triangular side elevation matching the angular form of the wheel well formed by said main wing spar and wing root.

4. In an airplane of the swept wing type having a torsion box type of wing spar, a main landing gear wheel well in the non-stressed trailing edge of the wing section, said wheel well being of triangular form defined by the rear side of said torsion box type of wing spar as its forward wall, the root of the wing as its inboard wall, and an auxiliary spar in said trailing edge disposed normal to the wing root and extending to the rear face of said torsion box forming the rear wall of said triangular wheel well.

5. An arrangement as in claim 4 wherein an articulated bogie type of landing gear is pivotally mounted between the front and rear walls of said wheel well for retraction into said well.

6. In combination with swept wing aircraft having a wheel well of generally triangular form located in the tapered trailing edge portion of the wing section, retractable landing gear comprising a three wheel articulated bogie of generally triangular form in both side elevation and plan, one side of the side elevation triangle being disposed adjacent the root of the wing when the gear is retracted, and one side of the plan triangle being disposed adjacent the forward part of the wheel well when the gear is retracted whereby the landing gear conforms to the wheel well shape in both plan view and depth.

7. Retractable landing gear for an aircraft having a generally triangular wheel well comprising a strut pivotally supported at one end in the wheel well, and an articulated bogie at the other end of the strut comprising a front lever pivoted to said strut, a pair of wheels journaled on a common axle carried by said front lever, a rear fork-like lever of greater length than the front lever also pivoted to said strut, a single wheel journaled in the fork-like lever to be a greater distance from said strut than said pair of wheels, and load distributing means for the wheels comprising equalizer means pivoted on said strut in spaced relation to the articulated bogie, a rigid link connecting one end of said equalizer means to the fork-like lever and shock absorbing means connecting the other end of said equalizer means to the front lever.

8. Retractable landing gear for an aircraft having a wheel well comprising a strut pivotally supported at one end in the well, and an articulated bogie at the other end of the strut comprising a front lever pivoted to said strut, a pair of wheels journaled on a common axle carried by said front lever, a rear fork-like lever of greater length than said front lever also pivoted to said strut, a single wheel journaled in the fork-like lever to be a greater distance from the strut than said pair of wheels, and equalizer means for distributing the load on said strut to said front and fork-like levers in proportion to the carrying capacity of the wheels mounted thereon.

9. In a landing gear for airplanes, a main strut of fixed length, a forwardly and rearwardly extending lever having the adjacent ends thereof pivotally mounted together at the bottom of said strut for independent vertical oscillatory movement of the lever, a pair of wheels rotatively mounted at the free end of the forwardly extending lever, a single wheel rotatively mounted at the free end of the forwardly extending lever, and equalizing linkage interconnecting said levers and said strut, said equalizing linkage and levers being so proportioned as to divide the load carried by the front and rear wheels in proportion to the load carrying capacity thereof.

10. Landing gear as in claim 9 wherein the equalizing linkage includes shock absorbing means.

11. Landing gear as in claim 9 wherein the equalizing linkage comprises an equalizer lever pivoted to the strut at an intermediate point in the length of the lever, a rigid link pivoted at its ends between one end of the equalizer lever and the rearwardly extending lever, and a shock absorber of the telescoping type pivoted between the other end of the equalizer lever and the forwardly extending lever.

References Cited in the file of this patent

UNITED STATES PATENTS

| | | |
|---|---|---|
| 2,130,914 | Warren | Sept. 20, 1938 |
| 2,487,548 | Hawkins | Nov. 8, 1949 |
| 2,490,485 | Spaeth | Dec. 6, 1949 |
| 2,579,180 | Eldred | Dec. 18, 1951 |
| 2,621,004 | Ashton | Dec. 9, 1952 |

FOREIGN PATENTS

| | | |
|---|---|---|
| 651,149 | Great Britain | Mar. 14, 1951 |
| 663,245 | Great Britain | Dec. 19, 1951 |